United States Patent Office 2,912,361

Patented Nov. 10, 1959

2,912,361

CANINE DISTEMPER VACCINE AND ITS PREPARATION

Ernest J. Froelich, Albany, N.Y., assignor to Sterling Drug Inc., New York, N.Y., a corporation of Delaware No Drawing. Application November 28, 1956
Serial No. 624,944

3 Claims. (Cl. 167—78)

This invention relates to a vaccine for the induction of active immunity against the virus of canine distemper and to a process for its preparation. In particular, it relates to a stable viable canine distemper vaccine is desiccated form comprising living, egg-adapted, canine distemper virus and, as essential stabilizing agents to maintain viability of the virus, sucrose and pancreatic digest of casein.

For many years virologists have been seeking a safe and reliable preparation for immunizing susceptible animals against canine distemper. Active immunity can result from: (1) repeated parenteral injection of killed distemper virus; (2) the induction of subclinical infection by simultaneous injection of specific antiserum and an adequate dose of virulent unmodified virus; (3) the induction of a subclinical infection by the injection of ferret tissues containing ferret-adapted canine distemper virus characterized by reduced pathogenicity for dogs and foxes as a consequence of repeated passage in ferrets; (4) by the production of a subclinical infection consequent to the injection of canine distemper virus, the pathogenicity of which has been modified by adaptation to multiplication in chick embryo tissues.

It is a basic tenet of immunology that the degree of immunity produced against a given agent is related to the amount of antigen provided for its stimulation. When killed vaccine virus is used, a large amount of antigen in the form of dead virus particles or their antigenic components must be deposited in the tissues. When live virus is used, the necessary amount of antigen is provided by multiplication of viable virus, either during the course of a clinically apparent infection, or during the course of a modified or subclinical infection. In the latter instance the artificial induction of active immunity requires that the number of viable virus particles introduced be sufficient to establish a definite infection. If the establishment of active infection fails, or the infection is quickly aborted with only limited multiplication of virus, a protective degree of immunity may not be produced or if produced it may be transient or inadequate.

A canine distemper vaccine of choice is one comprising a sufficient number of viable particles of a fully modified strain of virus to establish the necessary subclinical infection. If the number of viable particles is insufficient to establish such infection, the effect can be no greater than would result from injection of a very dilute killed virus vaccine.

Two varieties of chick embryo adapted canine distemper vaccine virus have been used for producing active immunity distemper, namely strains of virulent street virus which have been adapted to multiplication in the chick embryo by repeated passage without intervening adaptation to ferret tissues, and strains, such as the Onderstepoort strain, which is a ferret adapted strain still capable of occasionally causing clinical disease in dogs and which has been rendered completely non-pathogenic for dogs by further modification consequent to repeated passage in the chorioallantoic membrane of chick embryos. Any of these distemper strains can be used in the preparation of my vaccine. However, all varieties of distemper virus are notoriously delicate and when dispersed in conventional menstrua, viability is lost at temperatures above freezing even after having been desiccated in a frozen state. The development of a menstruum which will increase the survival time of the vaccine virus in the desiccated state will therefore increase the shelf life of the product and its reliability as an active immunizing agent.

It is therefore an object of my invention to increase significantly the viability of desiccated avianized canine distemper virus vaccine at elevated (above freezing) temperatures, thereby resulting in a product of increased shelf life and, consequentially, in a greater dependability of the vaccine as an immunizing agent.

To accomplish this objective, it was necessary to develop a menstruum which could be used as a stabilizing diluent for homogenization of virus infected chick embryo components in preparation for freeze-drying, and therefore as a stabilizing menstruum in which the virus particles are dispersed in liquid medium during the drying process and, particularly, in the dry state during storage and transport (i.e. until the moment of reconstitution and use), so that the number of viable virus particles or infectious units present in the freshly reconstituted vaccine are substantially greater than heretofore attained. My invention thus comprehends a stable canine distemper vaccine preparation in desiccated form showing superior maintenance of viability and to a process for its preparation.

The duration of preservation of viability (infectivity in the case of viruses and rickettsiae) may be affected either favorably or unfavorably by storage temperature, desiccation, and the nature of the menstruum in which the organism is dispersed. Viruses and rickettsiae may differ widely in their requirements for optimum conditions of preservation. For example, it is well-known that rickettsiae in infected tissues may be rapidly frozen and stored almost indefinitely at −72° C. without loss of viability [Bovarnick et al., J. of Bacteriology, 59, 509–521 (1950)] but similar material or purified washed rickettsiae are much less viable when dried in the frozen state and held at temperatures above freezing. Poliomyelitis virus is relatively stable when preserved in glycerine at about 5° C., yet it will slowly lose viability when stored in the frozen state and it is rapidly destroyed by freeze-drying. Canine ienfectious hepatitis virus is highly resistant to environmental effects of temperature and menstrua whereas the equally contagious virulent canine distemper virus must be quickly frozen and maintained at temperatures below −50° C. unless special menstrua are used. Canine distemper virus rapidly loses viability at room temperature when virus-infected tissues are dispersed in conventional bacteriological media, peptone water, physiological saline, phosphate buffer solution, and the like. Examination of the literature showed that a variety of menstrua have been shown to have varying degrees of utility with respect to preservation of viability of certain specific viruses. From the literature it might be inferred that the presence of certain complex substances such as animal tissues, egg yolk, serum, skim milk, etc. may favor preservation but viruses differ in their requirements. Speck et al. [J. Bact., 61, 253–258 (1951)] pointed out that in animal tissues the virus of herpes simplex is relatively stable at refrigerator temperatures or in the frozen state, but the same virus, when adapted to eggs (chick embryo) is unstable even in a Dry Ice cabinet (−72 to −70° C.) unless mixed with skim milk or egg yolk prior to freezing and storage (as a 10 or 50% concentration of virus infected embryonic fluid in the menstruum). These authors tested stability only at storage temperatures of −20° C. and −70° C. Duffy and Stanley [J. Exptl. Med., 82, 385 (1945)] substituted 10% skim milk in saline solution for 10% rabbit serum as the diluent in titrations and neutralization tests, but they were not concerned with prolonged duration of viability in a desiccated state. References cited by Dick and Taylor [J. of Immunology 62, 311–317 (1949)] show that viruses differ greatly with respect to suitability of different sera for stabilizing viruses in aqueous vehicles during titrations. Bovarnick et al. (loc. cit.) confirmed an earlier observation by Anderson [J. Bact. 47, 519 (1944)] that skim milk favored the survival of purified rickettsiae in suspensions. These authors found that a buffered salt solution containing 0.2% casein hydrolysate (an acid hydrolysate) was useful in some experiments but a subsequent lot of hydrolysate was much less effective. They also found that glutamic acid or potassium glutamate could completely replace the particular casein hydrolysate used, but other amino acids were without effect on the stability of their rickettsial suspensions. They also found that several sugars, including glucose (dextrose), lactose and maltose were unsuitable for maintaining rickettsiae at room temperature but sucrose, when used in isotonic solution with the addition of 0.011 M phosphate buffer and 0.005 M glutamate was as useful as skim milk for the purpose. The addition of 1.0% bovine or human serum albumin gave further protection against loss of viability of the Breinl strain at room temperature (egg albumin was ineffective). For protection of rickettsiae during freezing and thawing it was found that buffer glutamate solution containing sucrose 0.05 M to 0.218 M gave a higher degree of preservation (50–100%) when tested by the mouse toxin method.

In connection with the study of Bovarnick et al. (loc. cit.), it was noted that they were dealing with highly purified suspensions of rickettsiae used for determination of respiratory activity at 30° C. or 34° C. over a 4 to 6 hour period. The viability of frozen suspensions was determined after "24 hours or longer" but the interest was in short term stability (4 to 6 hours) rather than conditions of storage. In no instance was their material desiccated.

From an examination of literature relating to the stabilization of various viruses and rickettsiae, it is thus seen that the problem of stabilizing a given virus or rickettsiae is highly specific; and that a solved problem in one instance is certainly not predictably applicable to another. This is particularly true where preservation of infectivity of the virus (rather than serological reactivity or other property) is essential such as in the case of canine distemper vaccine virus. Furthermore, the complexity of the problem is multiplied where the infectivity of the virus is to be maintained in the desiccated state.

I have now found that a stable canine distemper vaccine in desiccated form comprising living, egg-adapted, canine distemper virus can be obtained using, as essential stabilizing agents therefor, sucrose and pancreatic digest of casein (pages 875–6 of the fourteenth revision, 1950, of the Pharmacopoeia of the United States), the resulting vaccine showing superior maintenance of viability even under adverse storage conditions. In the preparation of the vaccine, I have obtained best results using a stabilizing menstruum comprising about two to ten percent by weight of each of sucrose and of the pancreatic digest of casein. A preferred stabilizing menstruum comprises about seven and one-half percent by weight of sucrose and about two percent by weight of the casein hydrolysate.

My invention also comprises a process for the preparation of a stable viable canine distemper vaccine which comprises mixing a chick embryo homogenate containing living, egg-adapted, canine-distemper virus with an aqueous stabilizing menstruum comprising about two to ten percent weight by volume each of sucrose and pancreatic digest of casein, freezing the resulting homogenous suspension, and dehydrating the frozen suspension under vacuum. By chick embryo homogenate I mean to include the decapitated chick embryo, the chorioallantoic membrane (c.a.m.) and the allantoic fluid; it was found experimentally that these chick embryo components contained the same concentration of distemper virus.

In practicing my invention I used the Onderstepoort strain of canine distemper virus. This strain was maintained by serial passage in seven-day old chick embryos. Its identity was established in four ways: (1) by its ability to infect embryonated eggs and produce typical lesions on the chorioalantoic membrane (c.a.m.); (2) by specific immunization tests in ferrets; (3) by serum neutralization tests in eggs; and (4) by inoculations of ferrets, dogs, mice, guinea pigs and rabbits to eliminate the possibility of having viruses other than that of canine distemper present.

The following examples will illustrate specific embodiments of my invention without, however, restricting it thereto.

STABILIZING MENSTRUA AND VACCINE PREPARATIONS

Experiments designed to demonstrate a satisfactory stabilizing menstruum which could be used for vaccine production were conducted as follows:

Seven-day embryonated eggs were infected with 0.1 ml. of a 1:100 dilution of the stock virus via c.a.m. After six days incubation at 36° C., the eggs were candled, and their c.a. membranes showing characteristic thickening and extensive plaque formation were harvested aseptically and pooled. The weight of the membranes was determined, and they were homogenized in a high speed mixer, such as a Serval Omni-Mixer. The freshly harvested tissues and fluids were kept cold at all times. Aliquots of the chick embryo homogenate were then distributed into Erlenmeyer flasks and each homogenate was immediately mixed with an equal volume of the stabilizing solution to be studied. After thorough mixing, 2 ml. amounts of each treated suspension were distributed into ampules which were shell-frozen and freeze-dried overnight. When the tissues appeared completely dry, the ampules were sealed under vacuum or nitrogen, and stored, some in the incubator at 37° C., and some in the refrigerator at 4° C. When reconstituted with 2 ml. distilled water, each ampule contained a 50% suspension of the egg tissue containing living distemper virus and one-half of the percentages originally present in the menstruum, i.e., 1 to 5% (weight per volume) each of sucrose and casein hydrolysate where 2 to 10% (weight per volume) each of these ingredients had been present in the menstruum, the actual weights being 20 mg. of casein hydrolysate and 75 mg. of sucrose.

It is part of the pharmaceutical art to estimate shelf-life of a product by submitting it to a process of accelerated aging by storage at elevated temperature. Because my objective was to develop a canine distemper vaccine with superior shelf-life in terms of content of viable virus, experiments were carried out to determine the relative stability of the various formulations by determining infectivity after incubating the desiccated products at 37° C. for 7, 14, and sometimes 21 and 28 days. At the end of each incubation period each sample of virus to be tested was reconstituted with 2 ml. of sterile distilled water immediately before use.

In order to determine the amount of viable virus present in each of the vaccine preparations, egg infectivity titrations were carried out in embryonated eggs using tenfold dilutions of each preparation in water, ranging from 1:10($10^{-1}$) to 1:100,000($10^{-5}$). The titration tests were carried out by inoculating 0.1 ml. amounts of each dilution onto the c.a.m. of six embryonated eggs. The eggs were incubated at 36° C. for 6 days, opened, their membranes carefully examined, and the degree of pathology recorded.

To permit quantitative and qualitative comparisons the following scheme was used for scoring pathological changes (viability scores) of the c.a. membranes observed. The average score of the six inoculated embryos has been designated the "Viability Index" for any given dilution of the test sample, as follows:

0 membrane thin and transparent (normal);
1 slight edema, no opacities;
2 slight edema, few diffuse opaque streaks or patches;
3 moderate edema, distinct opaque plaques and confluent opacities near the site of injection;
6 moderate edema, numerous confluent white areas extending to the lower parts of the egg;
10 marked edema, extensive opacities covering entire membrane.

Some of the menstrua tested and the results obtained with each of them are summarized in Table I below. For purposes of comparison, the results obtained after fourteen days of incubation are given.

Table I.—*Effect of incubation at 37° C. for 14 days on viability of canine distemper vaccine virus*

| Experimental Preparation Or Stabilizing Agents Used in Menstruum | Average Viability Scores At Various Dilutions | | | |
|---|---|---|---|---|
| | $10^{-1}$ | $10^{-2}$ | $10^{-3}$ | $10^{-4}$ |
| Control: | | | | |
| (1) 50% Tissue, Frozen, Not Dried, Not Incubated | 10.0 | 10.0 | 8.4 | 4.8 |
| (2) 100% Tissue, Freeze-Dried, Incubated | 0.4 | 0.16 | 0 | 0 |
| Freeze-Dried "Vaccines": | | | | |
| (3) Casein Hydrolysate* 2% + Sucrose 2% | 5.4 | 2.4 | 1.33 | 0.4 |
| (4) Casein Hydrolysate* 2% + Sucrose 7.5% | 6.6 | 3.5 | 2.0 | 1.0 |
| (5) Casein Hydrolysate* 5% + Sucrose 5% | 6.0 | 3.5 | 1.66 | 1.16 |
| (6) Casein Hydrolysate* 10% + Sucrose 10% | 6.2 | 2.6 | 1.8 | 0.6 |
| (7) Casein Hydrolysate* 2% | 4.2 | 2.5 | 0.8 | 0 |
| (8) Casein Hydrolysate* 10% | 1.0 | 1.0 | 0 | 0 |
| (9) Sucrose 7.5% | 4.2 | 1.83 | 1.0 | 0 |
| (10) Casein Hydrolysate* 2% + Dextrose 7.5% | 0 | 0 | 0 | 0 |
| (11) Casein Hydrolysate* 5% + Dextrose 5% | 0 | 0 | 0 | 0 |
| (12) Casein Hydrolysate* 2% + β-Lactose 7.5% | 0 | 0 | 0 | 0 |
| (13) Casein Hydrolysate* 5% + β-Lactose 5% | 0 | 0 | 0 | 0 |
| (14) Casein Hydrolysate* 2% + d-Mannose 7.5% | 0 | 0 | 0 | 0 |
| (15) Casein Hydrolysate* 5% + d-Mannose 5% | 0 | 0 | 0 | 0 |
| (16) Tryptose Phosphate Broth | 0.2 | 0 | 0 | 0 |
| (17) Nutrient Broth | 0.2 | 0 | 0 | 0 |
| (18) Normal Horse Serum 5% | 0 | 0 | 0 | 0 |
| (19) Bovine Albumin V 5% | 0 | 0 | 0 | 0 |
| (20) Bovine Serum Ultrafiltrate 5% | 0 | 0 | 0 | 0 |

*The casein hydrolysate I used in practicing my invention was pancreatic digest of casein, which conforms to specifications given by the National Institute of Health and the U.S.P. It is commercially available from Difco Laboratories as "Bacto-Casitone."

The results of representative tests are presented in Table I and can be summarized as follows:

(a) Freeze-drying of distemper virus tissues without the addition of a stabilizing menstruum resulted in almost complete loss of viable virus (Sample 2).

(b) Maximum preservation of the virus during freeze-drying and storage was obtained by adding to the freshly ground tissues a solution of casein hydrolysate 2% and sucrose 7.5% in buffered distilled water, pH 7.2 (Sample 4).

(c) Almost equally effective as Sample 4 were Samples 5 and 6 which contain, respectively, casein hydrolysate 5% and sucrose 5%, and casein hydrolysate 10% and sucrose 10%.

(d) The substitution of dextrose, β-lactose or d-mannose for sucrose in Samples 4 or 5 resulted in almost complete loss of preserving power (Samples 10, 11, 12, 13, 14 and 15).

(e) Sucrose 7.5% (Sample 9) and casein hydrolysate 2% (Sample 7) when used individually were less effective than when used together.

(f) Other protein or protein hydrolysate preparations (Samples 16, 17, 18, 19 and 20) had little or no virus protective properties.

The preferred stabilizing menstruum shown to give maximum protection to distemper virus was prepared as follows: To prepare 1 liter of buffered distilled water having a pH of 7.4, 80.8 ml. of M/15 $Na_2HPO_4$ and 19.2 ml. of M/15 $KH_2PO_4$ were mixed with 900 ml. distilled water; 2% casein hydrolysate and 7.5% sucrose (C.P.) were added, the percentage of each being on a weight per volume basis. The solution was then sterilized by autoclaving fifteen minutes at 15 lbs. pressure. The sterilized solution had a pH of 7.2, whereas the solution before autoclaving had a pH of 7.4. The pH of the sterilized solutions prepared according to the foregoing procedure was maintained neutral or in a slightly alkaline range, preferably about 7.0–7.4.

Experiments conducted with various batches of freeze-dried distemper vaccine prepared with this preferred casein hydrolysate-sucrose stabilizer have shown that the vaccine retained demonstrable viability for as long as 56 days of incubation at 37° C., thus indicating that it would keep under refrigeration for several years.

PREPARATION OF VACCINE

The following paragraphs relate to an illustrative preparation of my stable vaccine preparation comprising living, egg-adapted, canine distemper virus, and as the essential stabilizing agents therefor, sucrose and pancreatic digest of casein:

*Seed virus.*—A 50% suspension of c.a. membranes rich in modified distemper virus (Onderstepoort strain) was prepared in the preferred casein hydrolysate-sucrose (2%–7.5%) stabilizing menstruum and kept on hand frozen in a Dry Ice chamber.

*Eggs.*—White Leghorn eggs were incubated in a forced draft incubator at 38° C. for seven days. They were examined, and those showing good embryonic development were used for seeding.

*Inoculation of eggs.*—Using a 1 ml. syringe equipped with a ¼ inch 27 gauge needle, each egg was infected by injecting 0.1 ml. of a 1:100 aqueous dilution of the bacteria-free seed virus onto the c.a. membrane. Prior to the injection of virus, the site of injection was swabbed with an antiseptic agent, e.g., a tincture of benzalkonium chloride, and a hole drilled through the shell without damaging the shell membrane. After injection of the virus, the hole was sealed with paraffin wax and the eggs were transferred to an incubator at 36° C. and stored there for six days.

*Harvest and processing.*—The eggs were examined by transillumination and those found to have dead embryos were discarded. The eggs with living embryos were prepared for harvest by disinfecting the air-sac end with an antiseptic agent and by cutting the shell around the base of the air-sac. The shell tops were removed and the allantoic fluid, the decapitated embroys and the c.a. membranes were collected aseptically in sterile flasks which were kept cold by placing them in an ice bath. The weight of the harvested material was determined, and immediately thereafter, the material was homogenized in a cooled high speed mixer for four or more minutes, depending on the amount. The ground chick embryo homogenates were then transferred to a larger flask and diluted 1:1 (weight/volume) with the preferred casein hydrolysate-sucrose (2%–7.5%) stabilizing menstruum. The resulting suspension was stirred thoroughly and distributed aseptically in 1 ml. amounts into 5 ml. ampules. As soon as this was accomplished, the ampules were quick-frozen and mounted on the freeze-drying apparatus. Under the conditions of my experiments, drying was usually completed in ten hours. However, to assure desiccation, the ampules were left on the apparatus for twenty-four hours. Some of the batches of vaccine were sealed under vacuum and some under sterile dry nitrogen. Both procedures were found to be satisfactory.

*Stability.*—In order to determine the stability of the vaccine, representative samples from each batch were stored at 37° C. and the remaining ampules at 4° C. Using the egg-infectivity titration test and the pathology rating scheme, as described above, the following results in Table II were obtained with the vaccine prepared according to the procedure just described. For comparative purposes, the viability of canine distemper virus (egg-adapted) in three commercial canine distemper vaccines (designated A, B and C) was determined as above immediately after purchase. These results are also presented in Table II. On the basis of the expiration dates vaccines A and C were tested approximately one month after their date of manufacture and vaccine B was tested approximately nine months after its date of manufacture. In each instance, storage under refrigeration was indicated on the label and presumably complied with by the reputable distributors from whom the vaccines were obtained.

*Table II*

| Storage Conditions | Ave. Viability Score (6 eggs per group) | | |
|---|---|---|---|
| | $10^{-1}$ | $10^{-2}$ | $10^{-3}$ |
| 14 days at 4° C | 10.0 | 10.0 | 5.25 |
| 28 days at 4° C | 10.0 | 7.3 | 5.25 |
| 56 days at 4° C | 10.0 | 8.6 | 4.8 |
| 14 days at 37° C | 7.6 | 4.2 | 2.4 |
| 28 days at 37° C | 7.3 | 4.2 | 2.25 |
| 56 days at 37° C | 2.66 | 2.0 | 1.0 |
| Vaccine A (Refrigerated) | 1.5 | 0.5 | 0.4 |
| Vaccine B (Refrigerated) | 3.0 | 1.6 | 0.0 |
| Vaccine C (Refrigerated) | 2.0 | 1.16 | 0.0 |

These data in Table II show: (1) that my vaccine lost only little viability when stored under conditions of ordinary refrigeration at 4° C.; (2) that it retained most of its viability when stored up to 28 days at 37° C.; and, (3) that it retained a degree of viability when stored as long as 56 days at 37° C. comparable to that of three different currently commercial canine distemper vaccines which were tested immediately after purchase. My vaccine prepared as described above thus provides a preparation containing a significantly greater amount of viable virus than currently available vaccines purchased on the market. On the basis of the accelerated aging tests, this relative degree of superior viability would be extended under appropriate storage conditions.

*Potency test.*—Each batch of distemper vaccine was tested for immunizing potency in ferrets. A representative test with my vaccine prepared as described above was carried out as follows:

Groups of two ferrets were injected subcutaneously with 1 ml. of the freeze-dried vaccine diluted with distilled water to 1:5, 1:100 and 1:100. Temperatures were taken daily to detect possible systematic reactions following vaccination. All animals remained normal. Four weeks later, all ferrets, including one non-vaccinated control, were infected i.p. with 1 ml. of 20% ferret spleen suspension rich in virulent distemper virus (Cabasso strain). Again temperatures were taken for three weeks. All vaccinated animals remained normal, while the control ferret developed clinical symptoms and died of distemper on the 18th day following infection.

This experiment clearly indicates that a single administration to susceptible ferrets of my distemper vaccine diluted 1:5, 1:100 and 1:1000 solidly protects them against a severe challenge dose of virulent distemper virus. It also shows that the vaccine is nonpathogenic and safe for ferrets.

*Safety test.*—To prove that the virus contained in the vaccine is harmless, two ferrets were injected with 1 ml. of a vaccine dilution 1:1, and two susceptible puppies with 2 ml. of the same vaccine 1:1. Neither ferrets nor puppies showed any local or temperature reactions during the three-week observation period.

Additional proof of safety was established by injecting the vaccine intracerebrally into mice and guinea pigs, subcutaneously into guinea pigs and on the scarified corneas of rabbits. All animals remained normal during three weeks observation.

This application is a continuation-in-part of my copending application Serial No. 467,203, filed November 5, 1954, now abandoned.

I claim:

1. A stable, viable canine distemper vaccine preparation in desiccated form comprising living, egg-adapted, canine distemper virus and, as essential stabilizing agents to maintain viability of the virus, sucrose and pancreatic digest of casein.

2. A process for the preparation of a stable, viable canine distemper vaccine in desiccated form which comprises: mixing a chick embyro homogenate containing living, egg-adapted, canine distemper virus with an aqueous stabilizing menstrum comprising about two to ten percent each of sucrose and of pancreatic digest of casein; freezing the resulting homogenous suspension; and dehydrating the frozen suspension under vacuum.

3. A process for the preparation of a stable, viable canine distemper vaccine in desiccated form which comprises: mixing a chick embryo homogenate containing living, egg-adapted, canine distemper virus with an aqueous stabilizing menstrum comprising about two percent of pancreatic digest of casein and about seven and one-half percent of sucrose; freezing the resulting homogenous suspension; and dehydrating the frozen suspension under vacuum.

References Cited in the file of this patent

Speck et al.: J. Bact., March 1951, pp. 253–258.

Anderson: J. Bact., 47, 1944, p. 519.

"Freezing and Drying," pub. by Inst. of Biol., London, pp. 107–111, 133–137, 141 and 143.

Bovarnick et al.: J. Bact., vol. 59, January–June 1950, pp. 509–520 (p. 510 esp. pert.).

Dick: J. of Immuno., 1949, pp. 311–317.

Nature, 168, 4284, pp. 990–991.

UNITED STATES PATENT OFFICE
CERTIFICATE OF CORRECTION

Patent No. 2,912,361                              November 10, 1959

Ernest J. Froelich

It is hereby certified that error appears in the printed specification of the above numbered patent requiring correction and that the said Letters Patent should read as corrected below.

Column 1, line 18, for "vaccine is" read -- vaccine in --; column 2, line 48, for "ienfectious" read -- infectious --; column 7, line 58, for "and 1:100" read -- and 1:1000 --; line 59, for "systematic" read -- systemic --.

Signed and sealed this 10th day of May 1960.

(SEAL)
Attest:

KARL H. AXLINE
Attesting Officer

ROBERT C. WATSON
Commissioner of Patents